United States Patent
Choi et al.

[11] Patent Number: 5,978,325
[45] Date of Patent: Nov. 2, 1999

[54] METHOD AND APPARATUS FOR CHUCKING AN OPTICAL DISK AND DRIVING A TRAY IN OPTICAL DISK PLAYER

[75] Inventors: Kwang Mun Choi; Jun Sung Lee, both of Suwon, Rep. of Korea

[73] Assignee: Samsung Electronics Co., Ltd., Rep. of Korea

[21] Appl. No.: 08/928,293

[22] Filed: Sep. 12, 1997

[30] Foreign Application Priority Data

Sep. 13, 1996 [KR] Rep. of Korea ............... 96-29311 U
Sep. 13, 1996 [KR] Rep. of Korea ............... 96-39911

[51] Int. Cl.[6] .......................... G11B 17/22; G11B 33/02
[52] U.S. Cl. ........................................ 369/37; 369/75.2
[58] Field of Search ........................... 369/37, 36, 75.1, 369/75.2, 77.1

[56] References Cited

U.S. PATENT DOCUMENTS

| | | | |
|---|---|---|---|
| 4,755,978 | 7/1988 | Takizawa et al. | 369/37 |
| 5,123,005 | 6/1992 | Kurosu | 369/77.1 |
| 5,386,403 | 1/1995 | Morioka et al. | 369/37 |
| 5,563,857 | 10/1996 | Park | 369/37 |
| 5,742,571 | 4/1998 | Hoshino et al. | 369/37 |
| 5,771,213 | 6/1998 | Koshino et al. | 369/37 |
| 5,781,523 | 7/1998 | Ozawa et al. | 369/77.1 |

FOREIGN PATENT DOCUMENTS

5-166281  7/1993  Japan ...................... 369/37

*Primary Examiner*—David L. Ometz
*Assistant Examiner*—Tod Kupstas
*Attorney, Agent, or Firm*—Dilworth & Barrese

[57] ABSTRACT

An apparatus and a method for chucking an optical disk and for driving a tray in an optical disk player. Combined gears 40 includes a plurality of gears. In accordance with the revolutions of the combined gears, an optical disk is chucked, and a tray 12 is loaded. That is, when the combined gears 40 revolve, they are meshed with a first gear unit 50 to load the tray 12. If the combined gears 40 further revolve, then a protruding piece 48 of the combined gears 40 is engaged with a slider cam 37 to activate a chucking means. In a state with the optical disk chucked, if the tray 12 is to be loaded, the combined gears 40 mesh with a second gear unit.

15 Claims, 11 Drawing Sheets

METHOD AND APPARATUS FOR CHUCKING AN OPTICAL DISK AND DRIVING A TRAY IN OPTICAL DISK PLAYER

BACKGROUND OF THE INVENTION

1. Field of the Invention

The present invention relates to an apparatus and a method for chucking an optical disk and for driving a tray in an optical disk player. Particularly, the present invention relates to an apparatus and a method for chucking an optical disk and for driving a tray in an optical disk player, in which the tray is driven in such a manner as to be able to replace an optical disk during a chucking, and the optical disk can be chucked to a turn table by converting the rotating motion of a driving device into a linear motion.

Further, the present invention relates to an apparatus and a method for chucking an optical disk and for driving a tray in an optical disk player, in which the number of components of a transmission means is reduced compared with that of the conventional transmission means in which the driving paths are complicated.

Further, the present invention relates to an apparatus and a method for chucking an optical disk and for driving a tray in an optical disk player, in which one revolution is divided into a plurality of displacement angles, and the driving of the devices within a displacement angle is simultaneously done by making the chucking and driving of the tray respond to the respective displacement angles, so that an accurate actuation of the apparatus can be ensured, and that disorders and malfunctions of the apparatus can be prevented.

2. Description of the Related Art

Generally, optical disk apparatuses include mini-disk drivers (MDD), compact disk players (CDP), compact disk ROM players (CD ROM player) and the like. In these optical disk apparatuses, an optical reading device for writing and reading information to and from an optical recording medium by irradiating optical beams onto the optical recording medium is provided. For this purpose, optical disk driving devices and methods are provided therefor.

Among the optical disk apparatuses, the optical disk player is an apparatus in which information is recorded on an optical disk, or reproduced from the disk in the form of pictures and sounds. The existing art has progressed from an apparatus accommodating one optical disk to an optical disk player accommodating various sizes of optical disks, and further to an apparatus simultaneously accommodating a plurality of optical disks, so that a variety of information can be read in a convenient manner.

The optical disk player which is capable of simultaneously accommodating a plurality of optical disks includes: a loading device for loading or unloading a tray for accommodating a roulette for receiving a plurality of optical disks; and a chucking device for setting an optical disk of the roulette to an optical reading device.

In this conventional optical disk player, however, the loading device and the chucking device are separately provided with driving means respectively. Further, the power transmitting paths are complicated, and the number of the components is large. Therefore, the manufacturing cost is high, and disorders and malfunctions are frequent.

Accordingly, various mechanisms have been proposed for simultaneously loading and chucking the optical disk.

SUMMARY OF THE INVENTION

The present invention is intended to overcome the above described disadvantages of the conventional techniques.

Therefore it is an object of the present invention to provide an apparatus and a method for chucking an optical disk and for driving a tray in an optical disk player, in which the loading and chucking are made possible by a single driving means.

It is another object of the present invention to provide an apparatus and a method for chucking an optical disk and for driving a tray in an optical disk player, in which the number of components is reduced so as to save the cost compared with the conventional apparatus using many gears to transmit the power.

It is still another object of the present invention to provide an apparatus and a method for chucking an optical disk and for driving a tray in an optical disk player, in which one revolution is divided into a plurality of displacement angles, and the chucking and the tray driving are made to correspond to each of the displacement angles, thereby ensuring a reliable actuation of the apparatus, and preventing disorders and malfunctions.

It is still another object of the present invention to provide an apparatus and a method for chucking an optical disk and for driving a tray in an optical disk player, in which the driving of the devices within each of the displacement angles is made simultaneous, thereby simplifying the control of the driving motor.

In achieving the above object, the apparatus for chucking an optical disk and for driving a tray in an optical disk player according to the present invention includes: a roulette for accommodating a plurality of optical disks; a tray for mounting the roulette; a first deck for loading a moving tray, the first deck having a chuck installed thereon for chucking an optical disk; a second deck with a turn table installed thereon for chucking an optical disk, the second deck having an optical reading device installed thereon for reading data from the optical disk; combined gears for rotational motion in response to power from a transmission means; a chucking means for chucking an optical disk by moving the second deck to a certain distance in accordance with the revolutions of the combined gears; a first gear unit for being meshed with the combined gears over a certain angular range, and for driving the tray before the chucking of the disk; a second gear unit for being meshed with the combined gears over a certain angular range, and for being not meshed with the combined gears during the mesh between the first gear unit and the combined gears, and for driving the tray after the chucking of the disk; a first rack installed beneath the tray, for moving the tray in response to the first gear unit; and a second rack installed beneath the tray, for moving the tray in response to the second gear unit.

Preferably, the revolution angle of the combined gears is divided into: a first displacement angle for activating/releasing the chucking means; a second displacement angle for being meshed with the first gear unit; and a third displacement angle for being meshed with the second gear unit. Between the displacement angles, there can be provided additional angles. The combined gears should be preferably meshed with the transmission means all the time. Preferably, the combined gears include: a lower gear portion for being meshed with the transmission means over the total circumference of the lower gear portion; a middle gear portion installed upon the lower gear portion, for being meshed with the first gear unit in the second displacement angle; and an upper gear portion installed upon the middle gear portion, for being meshed with the second gear unit in the third displacement angle. Further, the combined gears may be provided with a protruding piece for activating the chucking means.

The first and second gear units are rotatably installed on the first deck, and coaxially installed with a lower gear (which is meshed with the combined gears), so that an upper gear would be preferably meshed with the first rack or the second rack. Further, the gear units should be preferably snap-coupled to the first deck.

The chucking means preferably includes: a supporting bar protruded from a side of the second deck; a slider cam having a groove for guiding the supporting bar, and for being engaged with the combined gears over the first displacement angle, to convert the rotary motion of the combined gears to a linear motion; and hinge pins for securing the second deck to the first deck to make the second deck revolve in accordance with the movement of the supporting bar so as to make the turn table of the second deck and the chuck of the first deck chuck the optical disk.

The slider cam may be provided with a recess for being engaged with the protruding piece of the combined gears. The rotating motion of the combined gears is converted into a linear motion by the slider cam, and the optical disk is chucked by the linear motion.

In order to maintain the slider cam at a moved position, a tension member may be fixed on the first deck.

The method for chucking an optical disk and for driving a tray in an optical disk player according to the present invention includes the steps of: supplying power from a transmission means to combined gears; coupling the combined gears and a chucking means together, and ativating/releasing the chucking means in accordance with the combined gears (first displacement step); making a first gear unit and the combined gears meshed together, for driving a tray with a roulette mounted thereon, before chucking of the disk (second displacement step); and making a second gear unit and the combined gears meshed together, for driving the tray with the roulette mounted thereon, after chucking of the disk (third displacement step).

The first displacement step includes the substeps of: coupling the combined gears and the slider together, for moving the slider in accordance with the revolutions of the combined gears; and moving a supporting bar of a second deck by being guided by a groove of the slider so as to make the turn table chuck an optical disk or release it, the second deck including an optical reading device for reading data, and a turn table for chucking an optical disk.

BRIEF DESCRIPTION OF THE DRAWINGS

The above objects and other advantages of the present invention will become more apparent by describing in detail the preferred embodiment of the present invention with reference to the attached drawings in which.

DETAILED DESCRIPTION OF THE PREFERRED EMBODIMENT

The preferred embodiment of the present invention will be described referring to the attached drawings, but the present invention will not be limited to the attached drawings.

Figure 1:
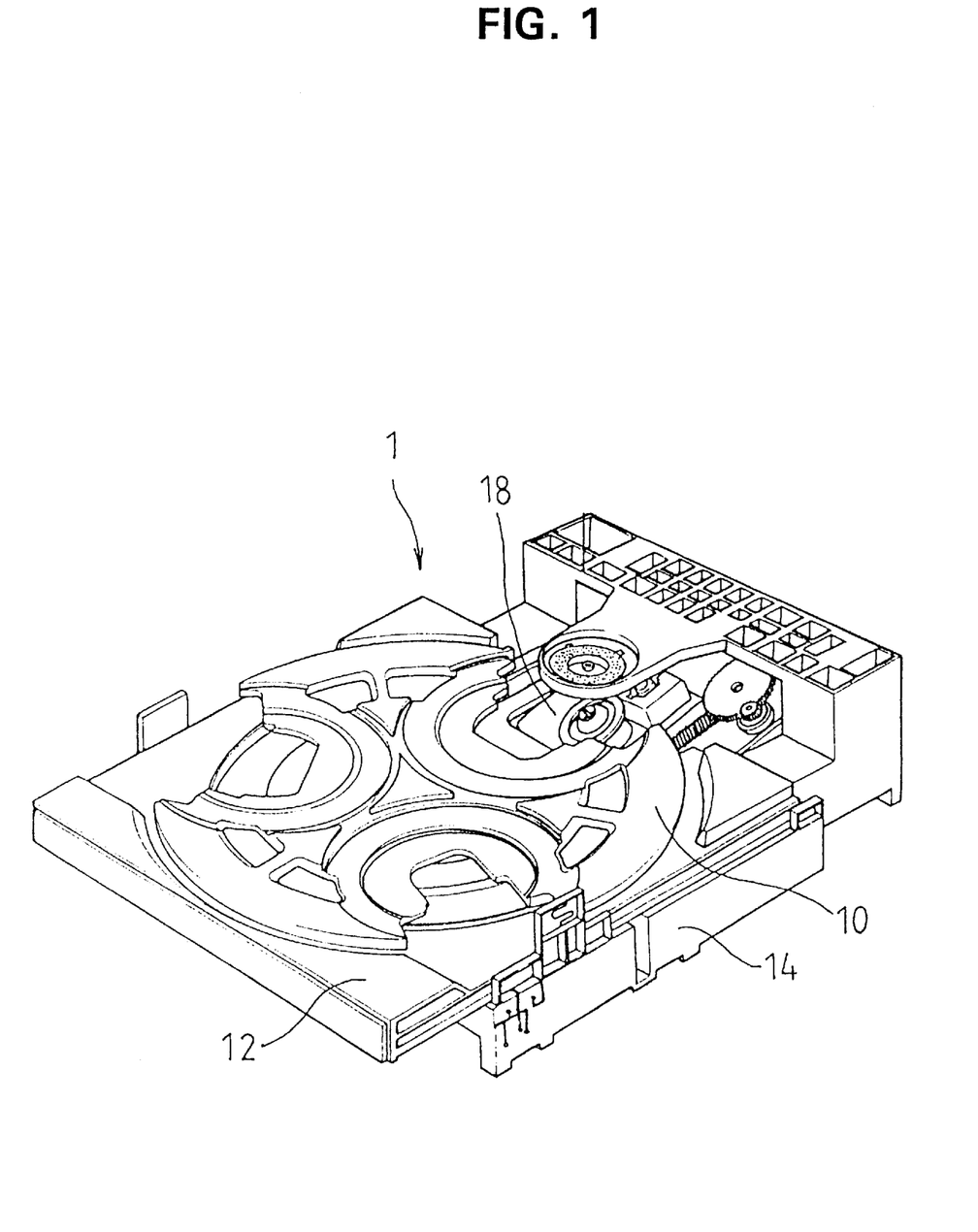
FIG. 1 is a perspective view of the optical disk player according to the present invention.

FIG. 1 is a perspective view of the optical disk player according to the present invention. An optical disk player 1 according to the present invention includes: a tray 12 having a roulette 10 with an optical disk mounted thereon; a first deck 14 with the tray 12 mounted thereon, and with a chuck installed thereon; and a second deck 18 with an optical reading device and a turn table installed thereon. The roulette 10 according to the present invention is capable of loading three optical disks in the preferred embodiment of the present invention. However, a plurality of coaxial circular recesses may be formed such that a plurality of optical disks can be loaded.

Figure 2:
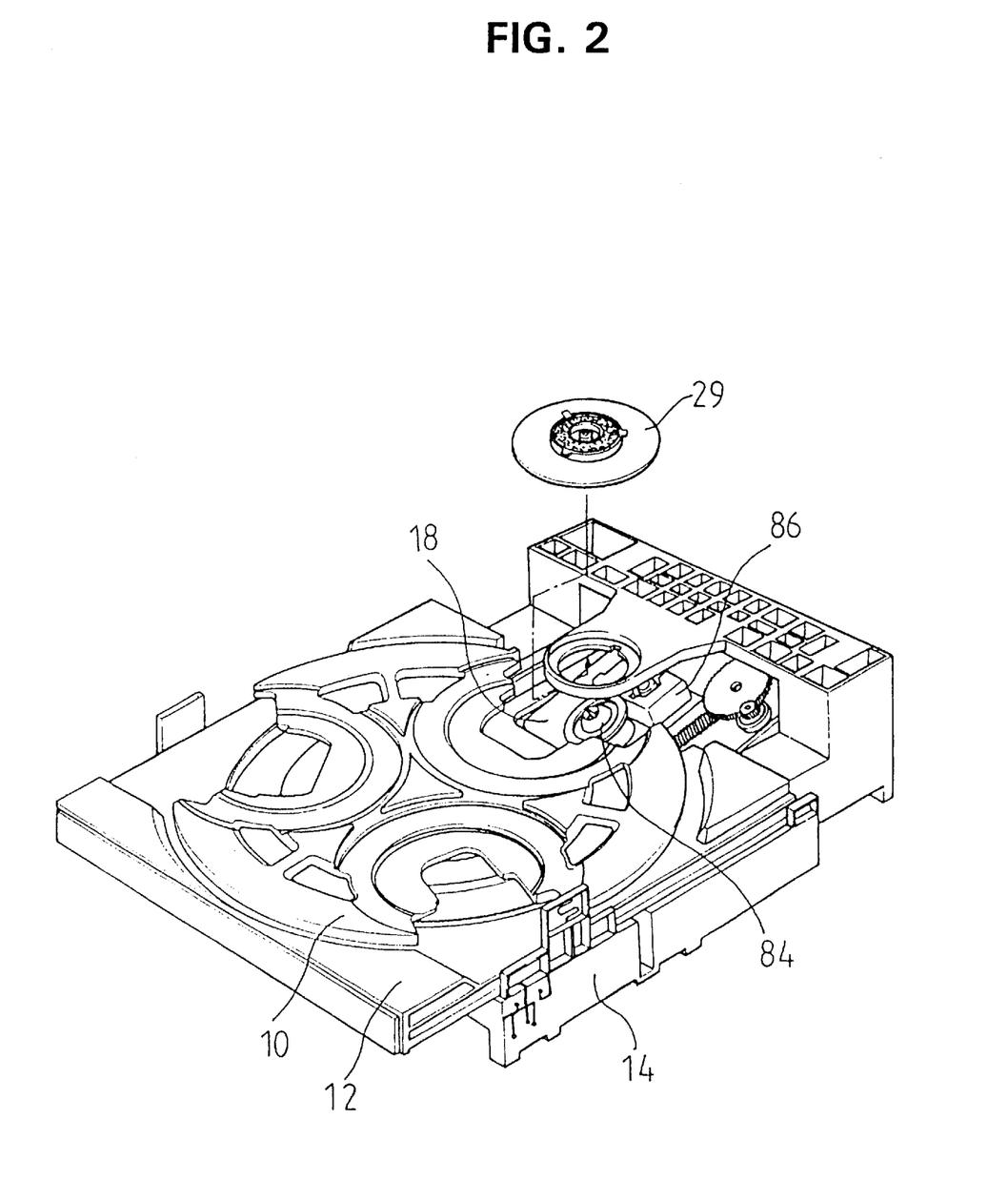
FIG. 2 is an exploded perspective view of the optical disk player according to the present invention.

FIG. 2 is an exploded perspective view of the optical disk player according to the present invention. In this drawing, the chuck 29 is separated. The drawing shows an optical reading device 86, a turn table 84 and the second deck 18.

Figure 3:
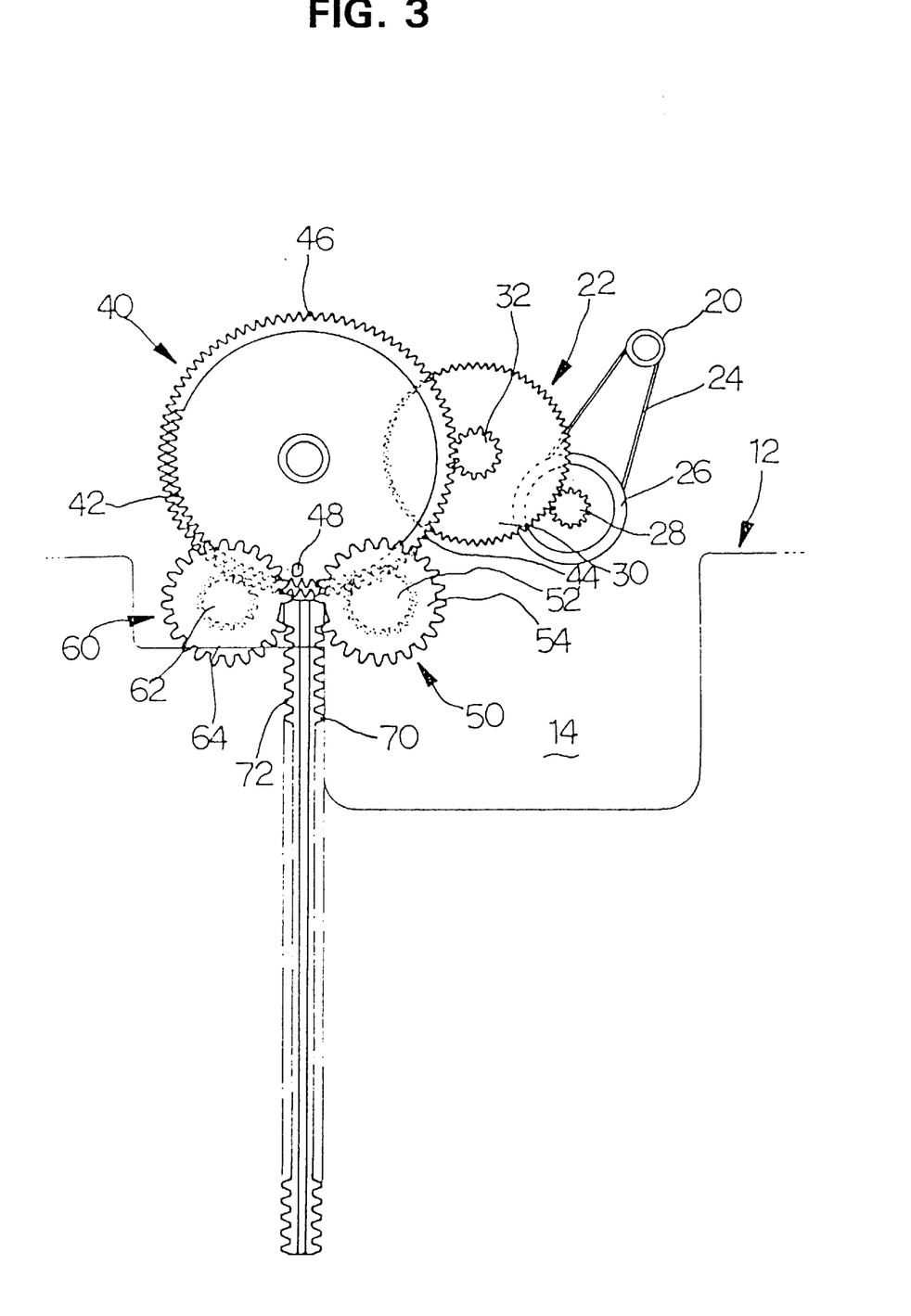
FIG. 3 is a schematic view showing a state before the tray is loaded in accordance with an embodiment of the present invention.

FIG. 3 is a schematic view showing a state before the tray is loaded in accordance with an embodiment of the present invention. The optical disk chucking and tray driving device of the present invention is installed between the tray 12 and the first deck 14. The power from a driving motor is transmitted through a belt 24 to a pulley 26. The power of the pulley 26 is transmitted through a first transmission gear 28, a second transmission gear 30 and a third transmission gear 32 to combined gears 40. As shown in the drawing, the combined gears 40 are capable of being meshed with a particular gear in accordance with a corresponding elevation. At the lowermost level of the combined gears 40, there is a lower gear portion 46 which receives power from the third transmission gear 32. Above it, there is a middle gear portion 44 which is meshed with a lower gear 52 of a first gear unit 50 over a certain angular range. Above the middle gear portion 44, there is an upper gear portion 42, while a protruding piece 48 is formed on the surface of the middle gear portion 44. The combined gears 40 are configured such that the first gear unit 50 and a second gear unit 60 should not revolve simultaneously. A first rack 70 and a second rack 72 are formed integrally with the tray 12. Thus if the upper gear 54 of the first gear unit 50 or the upper gear 64 of the second gear unit 60 revolves, then the tray 12 moves in the corresponding direction. The gear units are preferably snap-coupled without using screws. However, it is contemplated that the gear units may be fabricated using screws or other means known to one having ordinary skill in the art.

Figure 4:
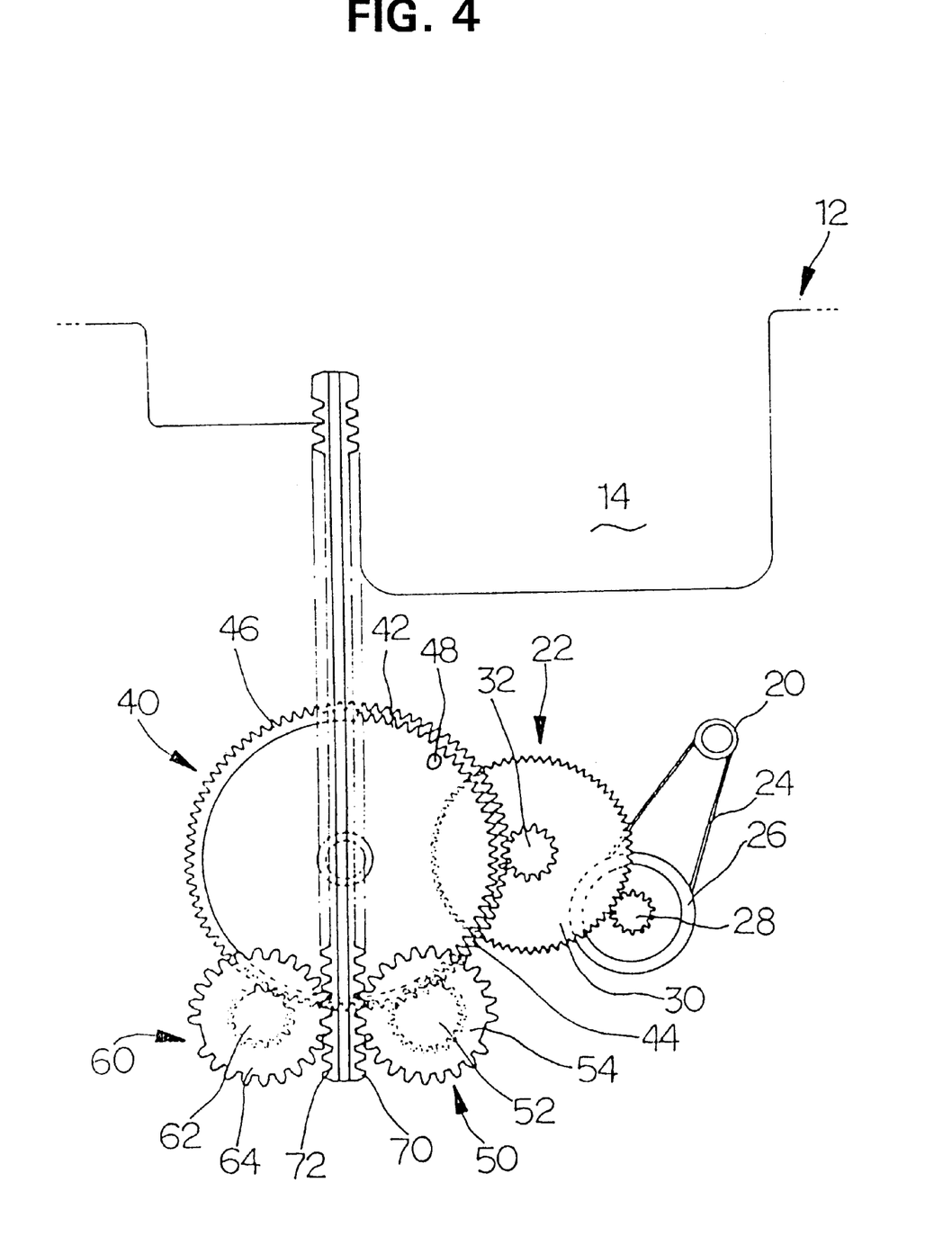
FIG. 4 is a schematic view showing a state after the tray is loaded in accordance with an embodiment of the present invention.

FIG. 4 illustrates a state in which the combined gears 40 have revolved from the state of FIG. 3, so that the first deck 14 would be loaded. Between the states of FIGS. 3 and 4, only the first gear unit 50 revolves, while the second gear unit 60 does not revolve.

Figure 5:
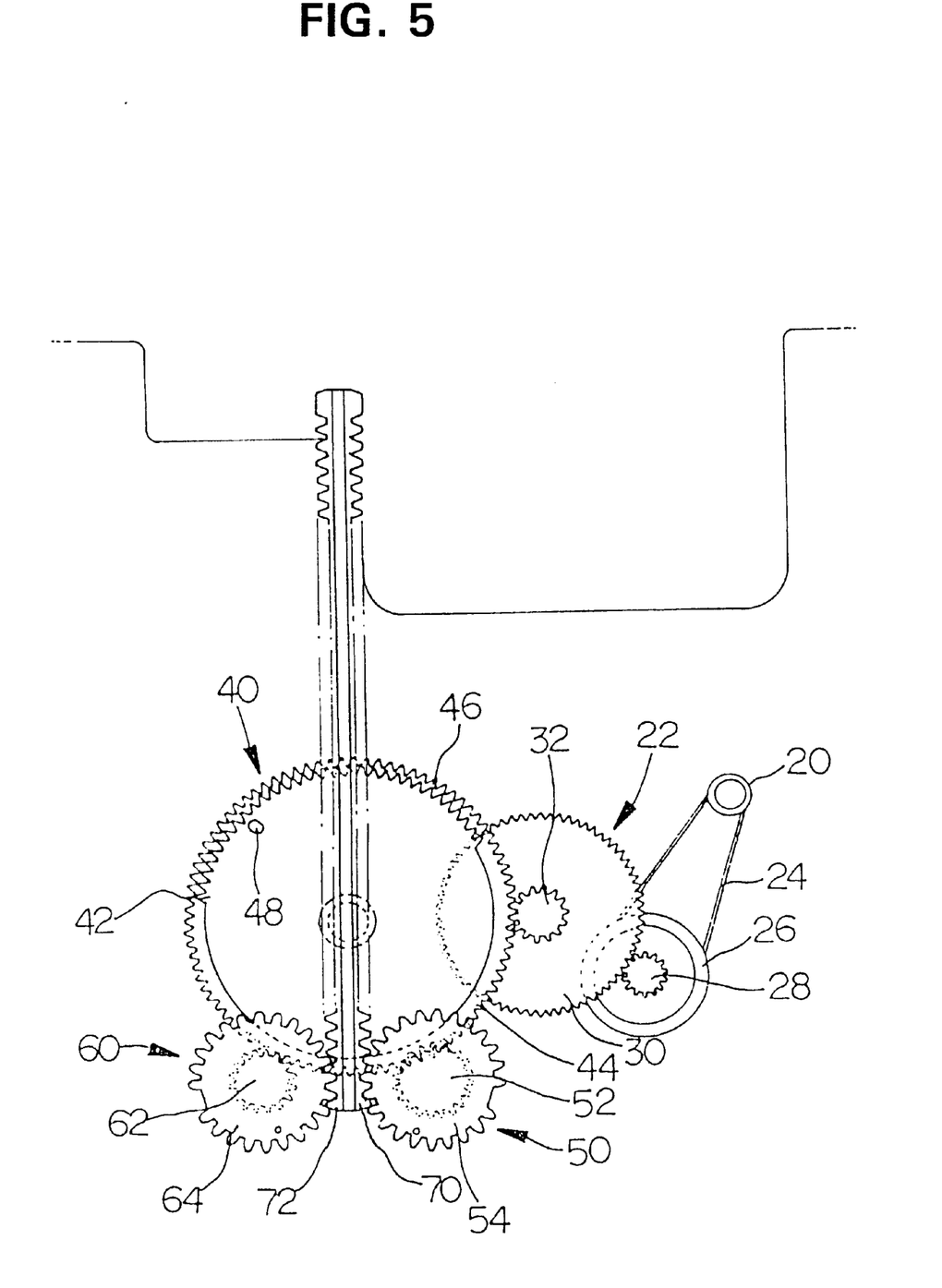
FIG. 5 is a schematic view showing a state after the second deck has been chucked in accordance with an embodiment of the present invention.
Figure 9:
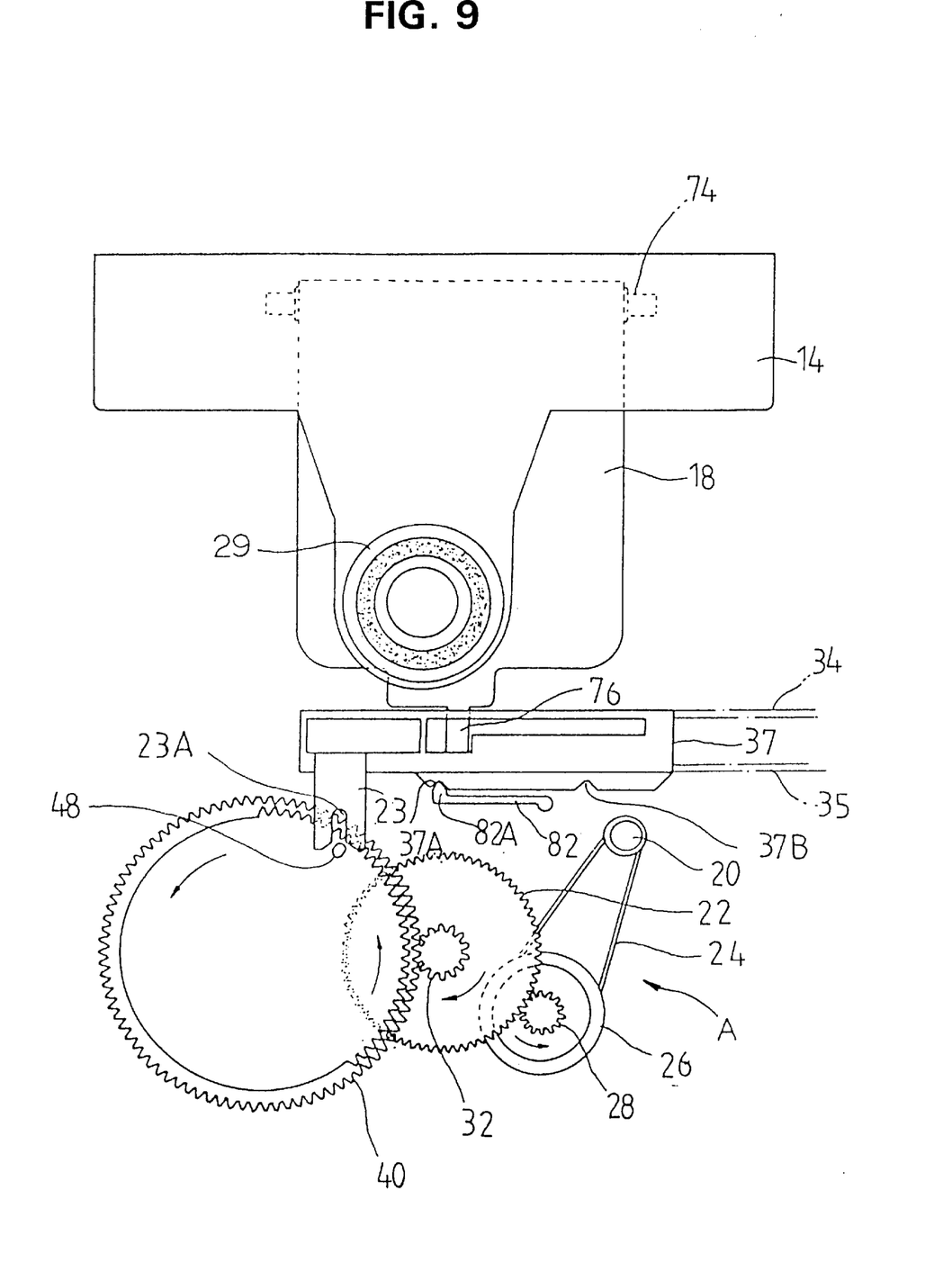
FIG. 9 is a plan view showing a state in which an optical disk is not chucked.
Figure 11:
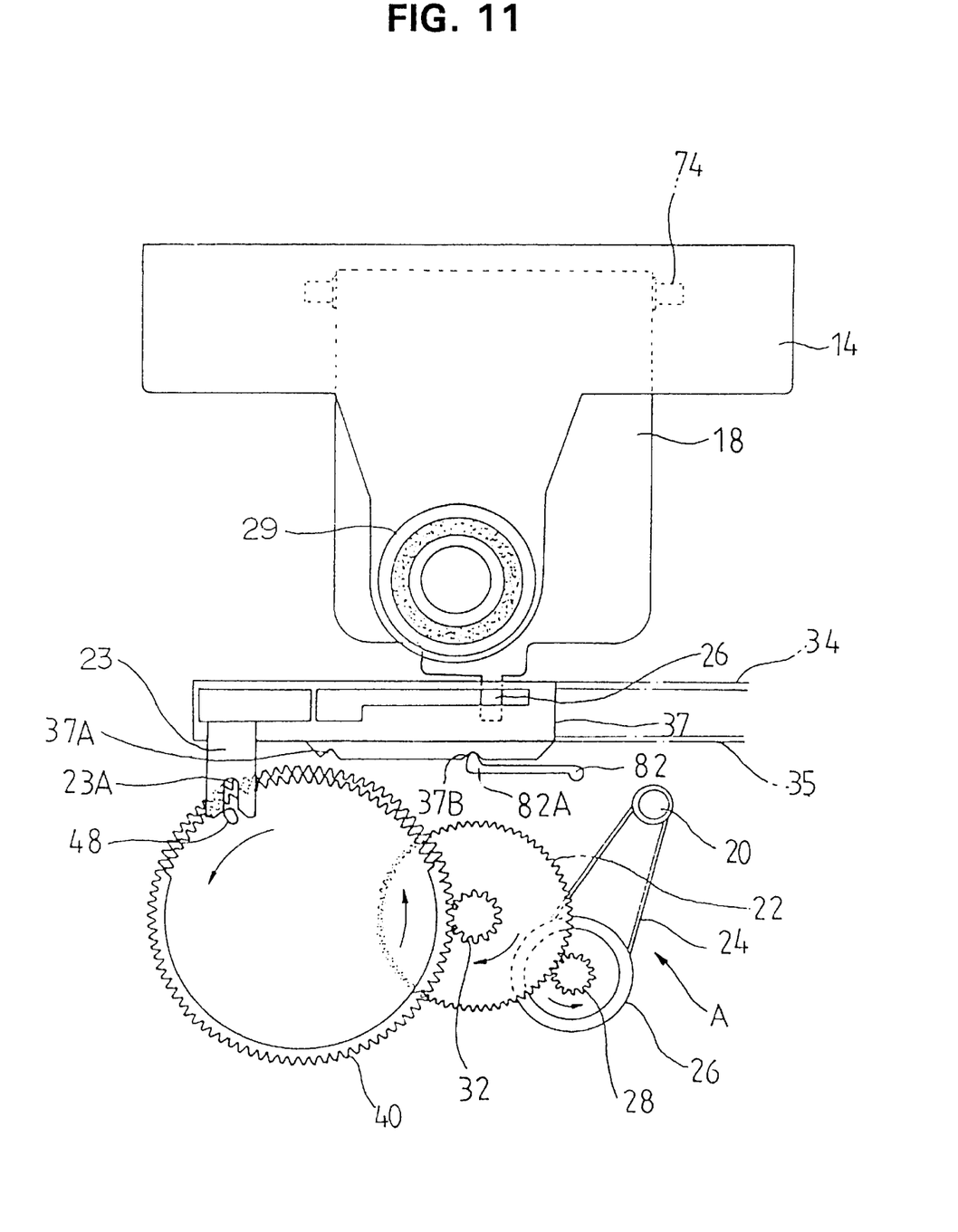
FIG. 11 is a plan view showing a state in which an optical disk is chucked.

Between the state of FIGS. 4 and 5, the first and second gear units 50 and 60 do not revolve, but only an optical disk chucking means is actuated as in FIGS. 9 and 11.

Therefore, owing to the motions between the state of FIG. 3 and the state of FIG. 5, the tray is loaded, and the optical disk is chucked by the chucking means. The actuation of the chucking means will be described later.

Figure 6:
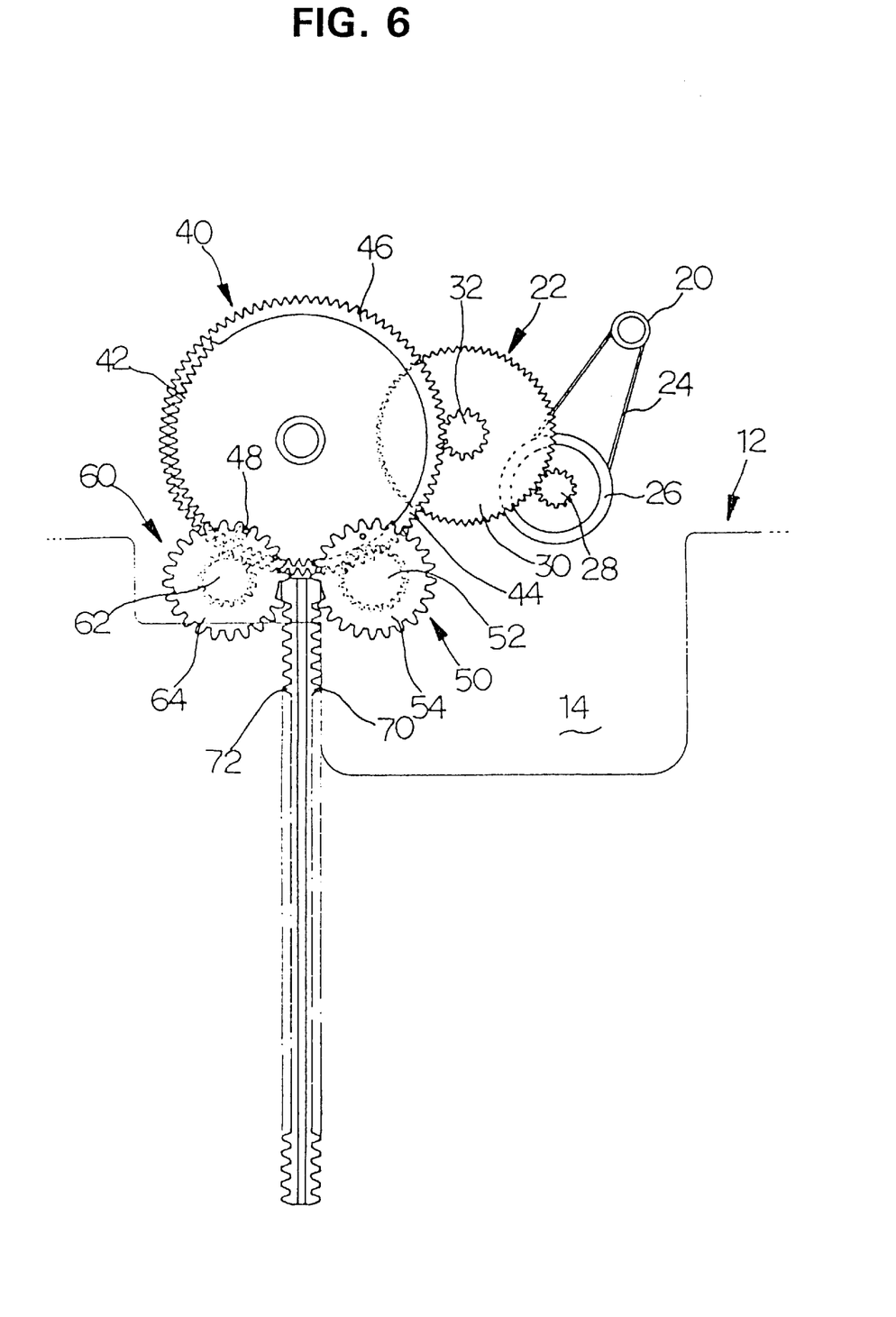
FIG. 6 is a schematic view showing a process of unloading the tray after the second deck has been chucked in accordance with an embodiment of the present invention.

In a state with an optical disk chucked by the turn table 84 and the chuck 29, if the optical disk on the roulette 10 is to be unloaded to replace the optical disk, then the combined gears 40 revolve from the state of FIG. 5 to the state of FIG. 6. Under this condition, owing to the revolutions of the combined gears 40, the second gear unit 60 revolves clockwise to unload the tray.

Figure 7:
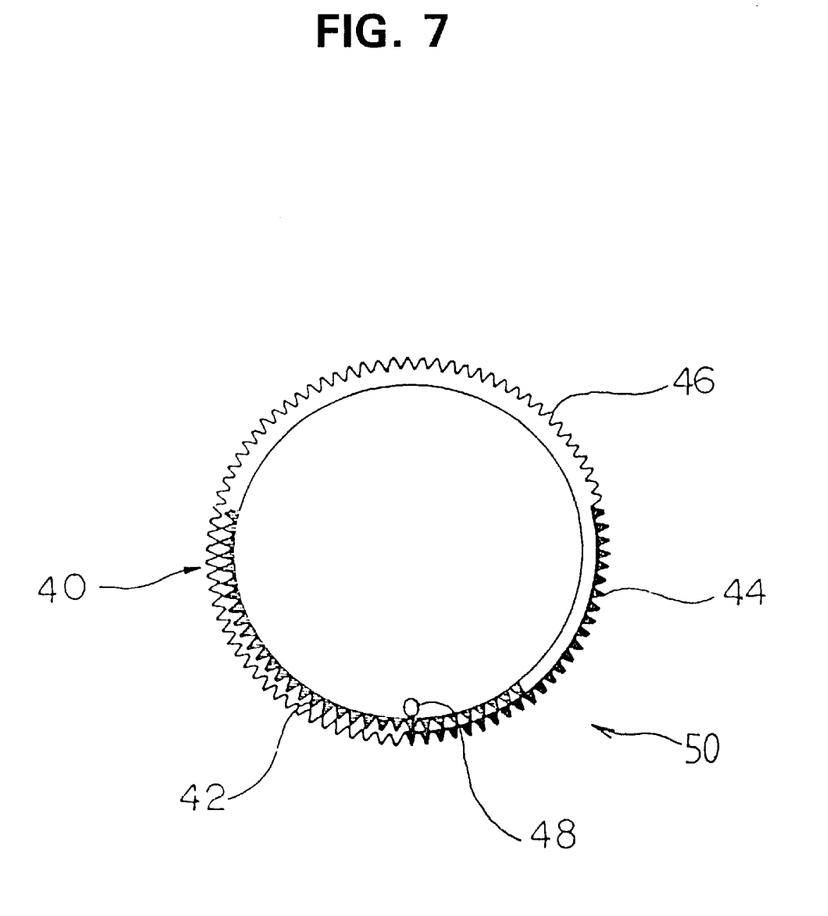
FIG. 7 is a plan view showing the divisions of the displacement angles of the combined gears according to the present invention.

FIG. 7 is a plan view of the combined gears 40 for carrying out the above actuation. As shown in the drawing, if it is assumed that the protruding piece 48 is formed at a 6 o'clock position, then the lower gear portion 46 is formed on the whole of the combined gears 40, and the middle gear portion 44 is formed on the right portion, while the upper gear portion 42 is formed at the left and lower portions. In order to prevent the simultaneous revolutions of the gear portions, the overlapped angle between the middle gear portion 44 and the upper gear portion 42 should be larger than the angle between the revolution center points of the respective gear portions relative to the center of the combined gears 40.

Figure 8:
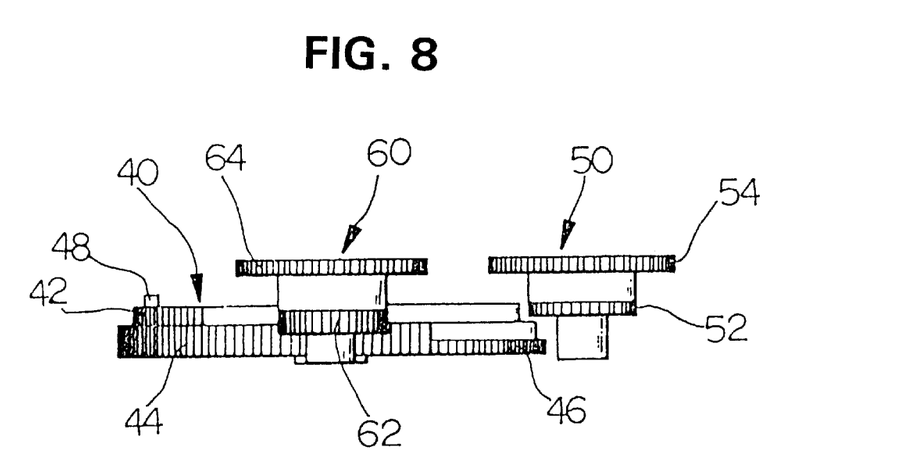
FIG. 8 is a schematic view showing the coupling relationship between the combined gears and the first and second gear units according to the present invention.

FIG. 8 illustrates the relationships between the combined gears 40, the first gear unit 50 and the second gear unit 60. The middle gear portion 44 of the combined gears 40 is meshed with the lower gear 62 of the second gear unit 60, while the upper gear portion 42 of, the combined gears is meshed with the lower gear 52 of the first gear unit 50. As shown in FIGS. 3 to 6, racks are disposed between the upper gear portions 54 and 64 of the first and second gear units 50 and 60, respectively.

FIG. 9 illustrates the chucking means according to the present invention. A slider cam 37 moves between rail grooves 34 and 35 of the first deck 14. A supporting bar 76 of the second deck 18 is inserted into a slider groove 80 of the slider cam 37, and moves within the slider groove 80. On one end of the slider cam 37, there is formed a recess portion 23A which linearly moves the slider cam 37 by being engaged with the protruding piece 48 when the combined gears revolve by a certain angle. The first deck 14 is provided with a tension member 82 for securing the slider cam 37 by clicking it. Therefore, the slider cam 37 is firmly secured before or after the chucking. The relationship between the combined gears and the transmission means is as described above.

Figure 10:
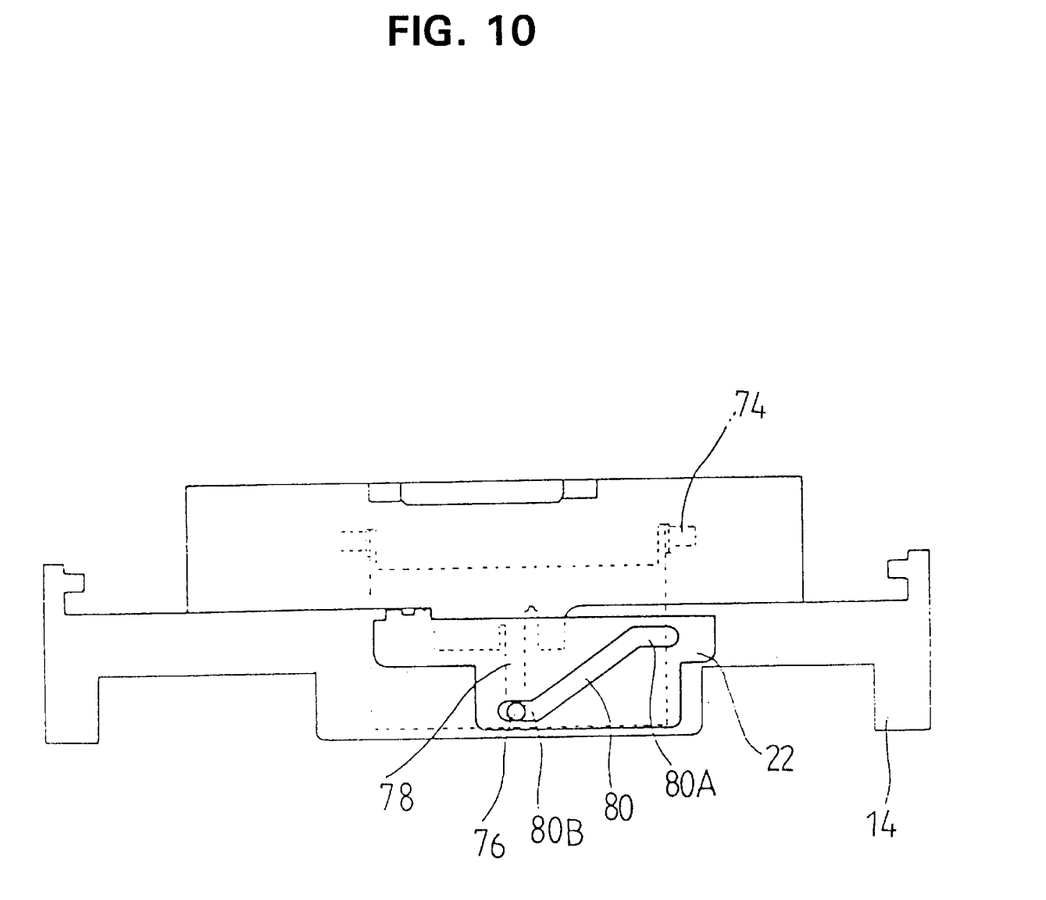
FIG. 10 is a side view showing a state in which an optical disk is not chucked.

FIG. 10 is a side view of FIG. 9. If the slider cam 37 moves horizontally, a slider groove 80 moves in the axial direction. The second deck 18 cannot move in the axial direction of the first deck 14 due to a hinge pin 74, but pivots vertically. Therefore, if the slider groove 80 moves, the supporting bar 76 moves vertically along a vertical groove 78 of the first deck 14. Accordingly, the second deck 18 vertically pivots to chuck the optical disk through an interaction with the turn table.

FIG. 11 illustrates a state in which the chucking has been completed in accordance with the present invention. As can be seen in the drawing, the slider cam 37 has been moved to the left side. A click edge 82A of the tension member 82 is placed in a click groove of the slider cam 37.

Figure 12:
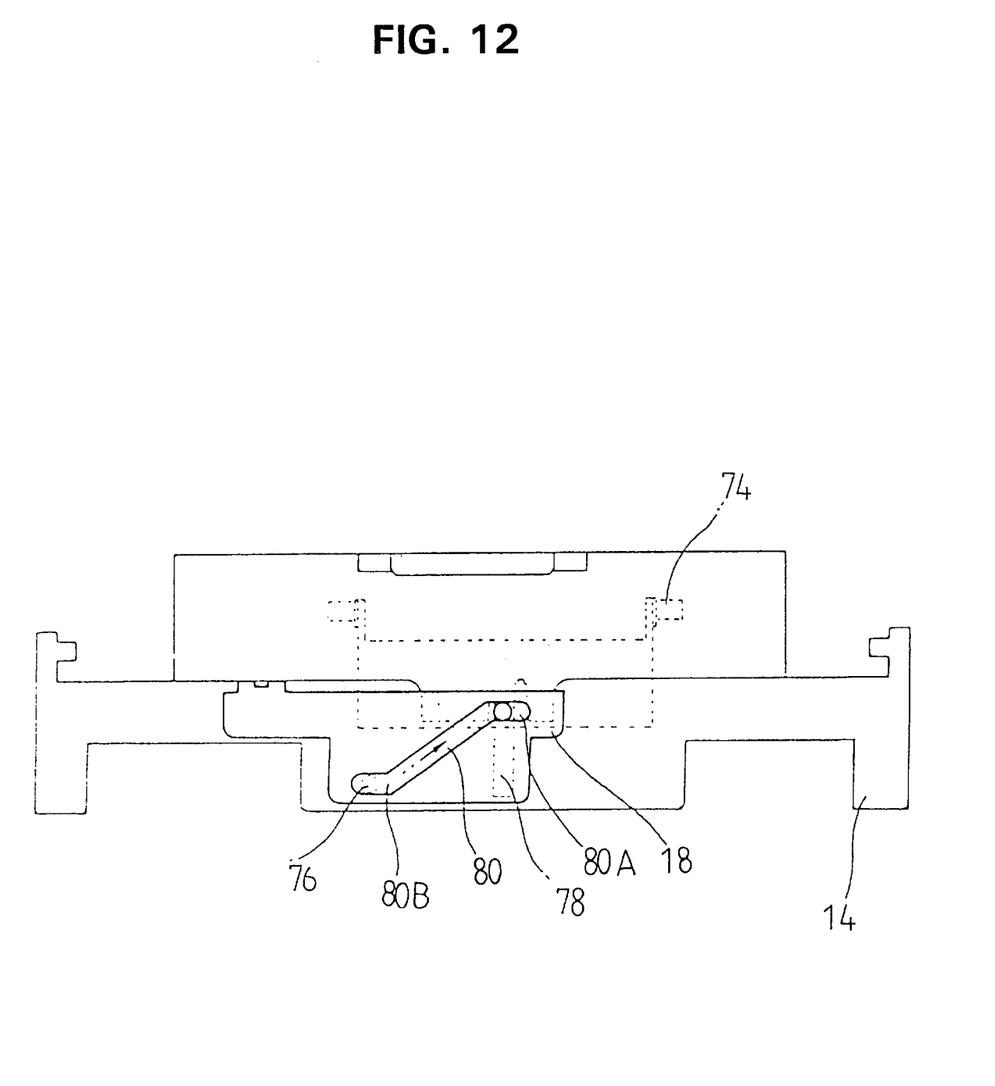
FIG. 12 is a side view showing a state in which an optical disk is chucked.

FIG. 12 is a side view of FIG. 11. As can be seen in FIG. 12, the supporting bar 76 lies at the uppermost position of the slider groove 80.

The apparatus of the present invention will now be described as to its actuation sequence.

Referring to FIG. 3, if a driving motor 20 is driven in an unloaded state, then power is transmitted through the transmission means to the combined gears 40. Then the first gear unit revolves, so that the tray 12 with the roulette 10 mounted thereon would be loaded. The loading completion state is illustrated in FIG. 4. The actuation sequence from FIG. 4 to FIG. 5 is the same as that of FIG. 9 and FIG. 11. In FIG. 9, the slider cam 37 moves to activate the chucking means so as to chuck the optical disk. In a state with the optical disk chucked, if the tray 12 is to be unloaded, the combined gears 40 have to be rotated from the state of FIG. 5 to the state of FIG. 6. Thus the second gear unit revolves clockwise, and the tray 12 is unloaded. After the user has replaced the optical disk, if the tray 12 is to be loaded again, then the combined gears 40 returns to the state of FIG. 5. In order to release the chucking, the combined gears 40 revolve clockwise. Then the slider cam 37 is engaged with the protruding piece 48 to push the slider cam 37 to the right so as to return to the state of FIG. 4. In a state with the chucking released, if the tray 12 is to be unloaded again, the combined gears 40 have to revolve clockwise. Accordingly, the first gear unit revolves counterclockwise to push the first rack 70 downward.

According to the present invention as described above, the loading and chucking are possible by one single driving means. Further, a multi-stage cam is provided so that the number of components would be reduced compared with the conventional apparatus. The cam revolution is divided into a plurality of displacement angles, so that the chucking and tray driving devices would be simultaneously actuated in accordance with the forward and reverse revolutions of the cam. Consequently, the control of the driving motor is simplified, and a reliable actuation of the apparatus is ensured. Accordingly, disorders and malfunctions can also be prevented.

What is claimed is:

1. An apparatus for chucking an optical disk and for driving a tray in an optical disk player, comprising:

a roulette for accommodating a plurality of optical disks;

a tray for mounting said roulette;

a first deck for loading said tray, the first deck having a chuck installed thereon for chucking a selected one of said plurality of optical disks;

a second deck with a turn table installed thereon for rotating the selected optical disk, the second deck having an optical reading device installed thereon for reading data from the selected optical disk;

combined gears configured to revolve in response to power from a single transmission means, said combined gears having a protruding piece on a surface thereof;

chucking means for chucking an optical disk by moving said second deck a predetermined distance in accordance with rotation of said combined gears over a first predetermined angular range, said chucking means including a slider cam configured to engage the protruding piece on the combined gears;

a first gear unit meshed with said combined gears over a second predetermined angular range, for driving said tray before the selected optical disk is chucked;

a second gear unit meshed with said combined gears over a third predetermined angular range, wherein the second gear unit is not meshed with said combined gears during a mesh between said first gear unit and said combined gears, for driving said tray after the selected optical disk is chucked;

a first rack installed beneath said tray, said first rack meshed with said first gear unit for moving said tray in a first direction in response to rotation of said first gear unit; and a second rack installed beneath said tray, said second rack meshed with said second gear unit for moving said tray in a second direction in response to rotation of said second gear unit wherein said chucking means and said first and second racks are driven in response to rotation of said combined gears and said single transmission means.

2. The apparatus as claimed in claim 1, wherein a revolution of said combined gears includes at least one additional angular range provided between said first, second and third predetermined angular ranges.

3. The apparatus as claimed in claim 1, wherein said combined gears comprise a plurality of gears to be meshed with respective gear portions in accordance with the predetermined angular ranges.

4. The apparatus as claimed in claim 1, wherein said combined gears comprise:

a lower gear portion for being meshed with said single transmission means over a total circumference of said lower gear portion;

a middle gear portion installed upon said lower gear portion, for being meshed with said first gear unit in the second predetermined angular range; and an upper gear portion installed upon said middle gear portion, for being meshed with said second gear unit in the third predetermined angular range.

5. The apparatus as claimed in claim 1, wherein said first and second gear units each comprises:

a lower gear rotatably installed on said first deck, for being meshed with said combined gears; and an upper gear coaxially installed with said lower gear, for being meshed with said first or second rack.

6. The apparatus as claimed in claim 5, wherein said first and second gear units are snap-coupled to said first deck.

7. The apparatus as claimed in claim 1, wherein said chucking means comprises:

a supporting bar protruded from a side of said second deck;

said slider cam having the groove for guiding said supporting bar, and for being engaged with said protruding piece of said combined gears over a first predetermined annular range, to convert a rotary motion of said combined gears to a linear motion; and at least one hinge pin for securing said second deck to said first deck to make said second deck revolve in accordance with movements of said supporting bar so as to make said turn table of said second deck and said chuck of said first deck chuck said selected optical disk.

8. The apparatus as claimed in claim 7, wherein said slider cam further comprises a recess portion for receiving said protruding piece.

9. The apparatus as claimed in claim 8, wherein said first deck comprises a fixed tension member to maintain said slider cam at a moved position.

10. An apparatus for chucking an optical disk and for driving a tray in an optical disk player, comprising:

a roulette for accommodating a plurality of optical disks;

a tray for mounting said roulette;

a first deck for loading said tray, the first deck having a chuck installed thereon for chucking a selected one of said plurality of optical disks;

a second deck with a turn table installed thereon for rotating the selected optical disk, and with an optical reading device installed thereon for reading data from the selected optical disk;

at least one combined gear comprising: a lower gear portion for being meshed with a single transmission means over a total circumference of said lower gear portion; a middle gear portion installed upon said lower gear portion, for being meshed with a first gear unit in a second displacement angle; an upper gear portion installed upon said middle gear portion, for being meshed with a second gear unit in a third displacement angle; and a protruding piece, for activating chucking means;

said chucking means for chucking the selected optical disk by moving said second deck a predetermined distance in accordance with rotations of said at least one combined gear through a first predetermined angular range, wherein said chucking means comprises a supporting bar protruded from a side of said second deck; a slider cam having a groove for guiding said supporting bar, and for being engaged with said at least one combined gear over the first predetermined angular range, to convert a rotary motion of said at least one combined gear to a linear motion; and hinge pins for securing said second deck to said first deck to make said second deck revolve in accordance with movements of said supporting bar so as to make said turn table of said second deck and said chuck of said first deck chuck the selected optical disk;

said first gear unit being meshed with said at least one combined gear over a second predetermined angular range, and driving said tray before the selected optical disk is chucked;

said second gear unit being meshed with said at least one combined gear over a third predetermined angular range, and being not meshed with said at least one combined gear during a mesh between said first gear unit and said at least one combined gear, and driving said tray after the selected optical disk is chucked;

a first rack installed beneath said tray, for moving said tray in a first direction in response to said first gear unit; and a second rack installed beneath said tray, for moving said tray in a second direction in response to said second gear unit wherein said chucking means and said first and second racks are driven in response to rotation of said at least one combined gear and said single transmission means.

11. The apparatus as claimed in claim 10, wherein said first and second gear units each comprises:

a lower gear rotatably installed on said first deck, for being meshed with said at least one combined gear; and an upper gear coaxially installed with said lower gear, for being meshed with said first or second rack.

12. The apparatus as claimed in claim 11, wherein said first gear unit is snap-coupled to said first deck.

13. The apparatus as claimed in claim 10, wherein said at least one combined gear further comprises a protruding piece, and said slider cam further comprises a recess portion for receiving said protruding piece.

14. A method for chucking an optical disk and for driving a tray in an optical disk player, comprising the steps of:

providing a tray having a roulette mounted thereon for accommodating a plurality of optical disks;

coupling combined gears with a chucking means and selectively activating or releasing said chucking means dependent upon given positions within a first predetermined angular range of said combined gears;

meshing a first gear unit with said combined gears to drive said tray with said roulette mounted thereon in a first direction, before chucking of the disks;

meshing a second gear unit with said combined gears to drive said tray with said roulette mounted thereon in a second direction, after chucking of the selected optical disk, wherein said second gear unit is not meshed with said combined gears during the step of meshing said first gear unit with said combined gears; and transmitting power to said combined gears with a unitary linkage via a single power source, wherein a revolution of the combined gears is divided into a plurality of displacement angles such that each of the chucking and driving operations is performed in response to a respective displacement angle.

15. The method as claimed in claim 14, wherein the coupling step comprises the substeps of:

coupling said combined gears and a slider together, for moving said slider in accordance with revolutions of said combined gears; and guiding a supporting bar of a second deck within a groove of said slider so as to make said turn table chuck said optical selected disk, said second deck including an optical reading device for reading data.

* * * * *